United States Patent [19]

McGlothlin

[11] Patent Number: 5,129,256
[45] Date of Patent: Jul. 14, 1992

[54] METHOD AND APPARATUS FOR LEAK TESTING OF CONDOMS BY PRESSURE DIFFERENTIAL

[75] Inventor: Mark W. McGlothlin, San Diego, Calif.

[73] Assignee: LRC Products, Ltd., London, England

[21] Appl. No.: 676,905

[22] Filed: Mar. 27, 1991

[51] Int. Cl.[5] .................................................. G01M 3/04
[52] U.S. Cl. .................................................... 73/40
[58] Field of Search ............ 73/37, 40, 49.2 R, 49.2 T, 73/40.7; 128/844, 842, 79; 604/346, 349

[56] References Cited

U.S. PATENT DOCUMENTS

| | | | |
|---|---|---|---|
| 2,370,945 | 3/1945 | Fields | 73/37 |
| 2,567,926 | 9/1951 | Dunkelberger | 128/294 |
| 2,855,926 | 2/1956 | Garrett | 73/40 |
| 3,177,704 | 4/1965 | Stange | 73/49.3 |
| 3,667,862 | 6/1972 | Parr | 73/40 |
| 3,991,604 | 11/1976 | Hayes et al. | 73/37 |
| 3,992,766 | 11/1976 | Field | 414/737 |
| 4,002,055 | 1/1977 | Kops | 73/40 |
| 4,118,972 | 10/1978 | Goeppner et al. | 73/40 |
| 4,683,745 | 8/1987 | Broughman, Jr. et al. | 73/49 |
| 4,855,169 | 8/1989 | McGlothlin et al. | 428/35.2 |
| 4,875,358 | 10/1989 | Marsh et al. | 73/40 |
| 4,954,309 | 9/1990 | McGlothlin et al. | 264/307 |

FOREIGN PATENT DOCUMENTS

1182326 9/1985 U.S.S.R. .......................... 73/49.2 R

Primary Examiner—Hezron E. Williams
Assistant Examiner—Raymond Y. Mah
Attorney, Agent, or Firm—Townsend and Townsend

[57] ABSTRACT

Condoms and similar sheaths are leak tested by being placed over a porous support form referred to as a mandrel similar in shape to the condom, and applying a pressure differential between the outside and the inside of the mandrel, which is preferably hollow. With the open end of the condom sealed in an airtight manner against a smooth surface at the base of the mandrel, leaks are detected by the flow of air or other gas into the mandrel interior.

29 Claims, 5 Drawing Sheets

METHOD AND APPARATUS FOR LEAK TESTING OF CONDOMS BY PRESSURE DIFFERENTIAL

This invention lies in the general fields of condom or sheath manufacture and pressure testing.

BACKGROUND OF THE INVENTION

Condoms have long been useful for contraceptive purposes, and are of ever increasing importance as a widely accepted and easily administered means of preventing the transmission of disease. In view of the widespread reliance on condoms, stringent requirements for leakage avoidance have been established. Leak testing has thus become a critical step in condom manufacture.

In current practice, condoms are leak tested by electronic means. According to these tests, a condom is placed over an electrically conductive rod (or "mandrel") which conforms in shape to the condom but is approximately 12% to 17% larger in diameter. The mandrel thus causes the condom to expand, enlarging any pinholes present in the condom to facilitate detection.

Leak detection is then conducted according to one of two methods. One method is a "wet test" method, in which the mandrel with condom stretched over it is immersed in a bath of electrically conductive aqueous solution. Approximately one volt of electrical potential is imposed between the solution and the stainless steel mandrel, and the system is monitored to detect any electrical current which results. The passage of a current indicates that a pinhole is present in the condom, and the condom is rejected.

The second method is a "dry test" method, in which the outer surface of the condom stretched over the mandrel is placed in contact with rotating conductive brushes or a fine stainless steel screen. An electrical potential of approximately 1000 volts is imposed between the mandrel and the brushes or screen, and the system is monitored to detect any electrical current arcing between the mandrel and the brushes or screen. If current is detected, the condom is either too thin or contained a hole before placement on the mandrel, and is rejected.

The wet and dry electronic test methods were designed for latex condoms, and both have limitations when applied to condoms of materials other than latex. In the wet test, the condom may become hydrated, causing its electrical conductivity to rise and yield a false test result. As a result, the wet test is not suitable for many alternative materials, including polyurethane.

In the dry test, the usual practice is to employ a testing mandrel that is significantly larger than the condom. Stretching the condom over such a mandrel increases the size of any pinholes that may be present, thereby increasing the sensitivity of the test. In addition, a condom stretched over an over-sized mandrel can only be removed from the mandrel by rolling the bead downwards. While this generally produces a rolled condom ready for lubrication and packaging, with certain materials a condom removed in this manner is too tightly rolled for subsequent use. Furthermore, the high voltage used in the dry electronic test may lead to dielectric breakdown of materials other than latex, particularly in the case of very thin condoms.

Finally, condoms made of materials other than latex may need to be shaped differently from latex condoms. These shapes may make it impractical to load such condoms onto electronic test mandrels, particularly when the mandrels are oversized.

SUMMARY OF THE INVENTION

Condoms are leak tested according to this invention by pressure differential, using a mandrel or support member of porous material. The electrical conductivity of the mandrel used in accordance with this invention is irrelevant. The mandrel instead serves to support the extended condom with no folding or overlapping in the surface portion of the condom to be tested, to equalize the pressure along the inner surface of the condom when a partial vacuum is drawn inside the mandrel, and to permit the flow of gas from outside the condom through any pinhole, tear, slit or other defect or discontinuity along that surface portion of the condom which might give rise to a leak, to the interior of the mandrel for detection.

The invention thus resides in a mandrel or condom support member of porous construction, appropriate equipment for creating a pressure differential across the mandrel wall with the outside pressure exceeding the inside pressure, and appropriate equipment for detecting gas passing through a leak in the condom and thus into the mandrel when the pressure differential is imposed. In preferred embodiments, the mandrel is of a size, external contour or both which causes the condom to stretch when the pressure differential is imposed, thereby amplifying any leak-causing defects. In further preferred embodiments, the outer surface of the mandrel is smaller in diameter than the inner diameter of the extended condom in the condom's relaxed or unstretched state, while the gross external surface area (i.e., the surface area absent the contribution from the pores) is greater than that of the inner surface of the extended and relaxed condom. This is achieved by indentations or other similar contour features on the outer mandrel surface. The smaller diameter makes it easier to place the condom on the mandrel, as well as to remove the condom from the mandrel once testing is complete, with a reduced risk of damage to the condom, while the larger surface area causes stretching of the condom material when the pressure differential is imposed.

The invention further resides in a method for leak detection involving use of such a mandrel or support member in conjunction with the pressure differential and gas flow detection equipment referred to above. The pressure differential is preferably imposed by drawing a partial vacuum inside the mandrel. Gas flow detection may be achieved in a variety of ways, examples of which are measurements of gas flow rate through the mandrel interior, detection of a rise in the pressure once the mandrel has been isolated from the vacuum source, and detection of the presence of a foreign gas inside the mandrel after placing such a gas in the atmosphere external to the mandrel.

Further features, advantages and embodiments of the invention in each of its various aspects will be apparent from the description which follows.

DETAILED DESCRIPTION OF THE INVENTION AND PREFERRED EMBODIMENTS

Two factors which influence the suitability of the mandrel for leak testing are the porosity and the permeability of the mandrel. The porosity or void volume must be sufficiently high to avoid any significant possibility of blockage of holes or other openings in the condom by the mandrel surface and to minimize any impedance to gas flow through the porous material of the mandrel. These considerations will also be affected by the size of the pores. The risk of blockage of openings in the condom will be less as the pore size is decreased. Resistance to gas flow will be greater, however.

The permeability is affected by the pore construction and shape and the thickness of the porous material through which the leaking gas must travel before it can be detected. To communicate the flow, the pores must be continuous and interconnected. The greater the degree of continuity and interconnection between the pores, the more efficient and effective the leak detection. A small proportion of closed cells such as may result from imperfect manufacturing procedures may be tolerated among the pore structure, but optimal results are achieved by minimizing or avoiding entirely the inclusion of such closed cells. In particular, all or substantially all pores will be in communication with the external surface of the mandrel, i.e., the surface which will be in contact with the condom during the test.

Other considerations include the texture of the outer surface of the mandrel. Despite the porosity, a surface smooth to the touch with a minimum of roughness is preferred, since this will induce a minimum of localized distortion of the condom and hence localized stress, which may cause puncturing or tearing of the condom. Surface smoothness will generally increase as the pore size is reduced. Further, although highly porous, the structure must be sufficiently rigid to avoid the possibility of collapse or significant compression when under the pressure differential which will be encountered in use.

With these considerations in mind, the pore structure may vary widely. Best results are generally obtained with mandrels whose pore structure has a void volume of between about 35% and about 60%. Best results are further obtained with pores ranging from about 0.2 micron to about 100 microns in diameter, preferably from about 10 microns to about 50 microns in diameter, as measured by conventional porosimetry techniques. These ranges are equally applicable to the widths of the pore openings at the external surface of the mandrel. The preferred median pore diameter and pore opening width are about 20 microns.

While fine pores and uniform porosity are desirable, it is also desirable that a minimal amount of gaseous volume be retained in the pore structure. The pores offer resistance to flow induced by a pressure differential, and thus tend to dampen the response of a detection system to the presence of a leak in the condom. To minimize such dampening and maximize the response time, the porous material of the mandrel in preferred embodiments of the invention may be formed as a shell with an open interior space, such as a hollow cavity, at its center. The wall thickness of the shell in these preferred embodiments need only be thick enough to lend structural integrity and rigidity to the mandrel, sufficient to avoid any risk of collapse, compression or any kind of distortion under the intended pressure differential. With these considerations in mind, the mandrel wall thickness may vary widely. In most applications, best results will be obtained with a wall thickness ranging from about 0.040 inch ($1.03 \times 10^{-3}$m) to about 0.500 inch ($1.27 \times 10^{-2}$m).

To further reduce the volume of gas retained in the mandrel, the interior of the porous mandrel shell may be occupied by nonporous solid material. In most cases, this will further improve the response even though the gas in this interior section will not be subject to the flow resistance created by the porosity of the shell. The solid material may be fused to the porous shell or may be a removable insert. The solid material will preferably include internal channels, furrows open to the porous shell, or a combination thereof to permit and enhance gas flow through the mandrel, and thereby to assist in equalizing the pressure throughout the mandrel. When the solid material is an insert, it may fit snugly inside the shell, touching on all sides, or loosely, with a gap separating it from the inner surface of the shell. A loose fit is preferred for purposes of further promoting pressure equalization and gas flow, and for ease of assembly.

Figure 1:
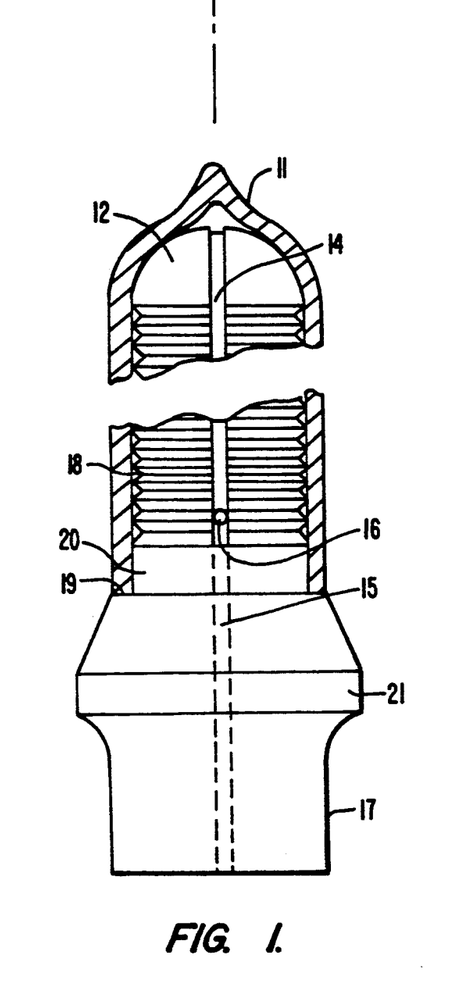
FIG. 1 is a side view in partial cross section of the combination of a porous condom support member, solid insert and base in accordance with the invention.
Figure 2A:
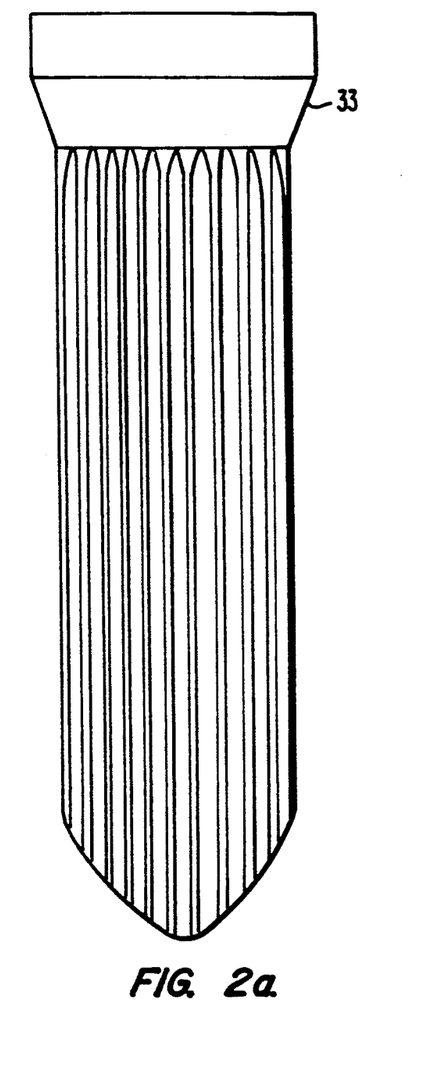
FIGS. 2a and 2b are side and cross-section views of one example of a porous condom support member in accordance with the invention, mounted on an expanded base for sealing the open end of the condom.
Figure 2B:
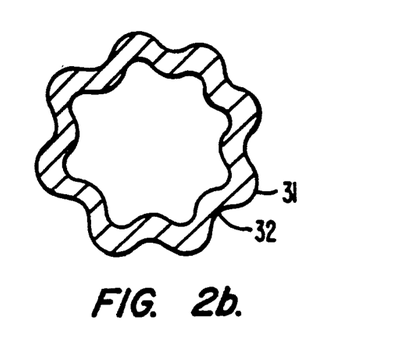
Figure 3A:
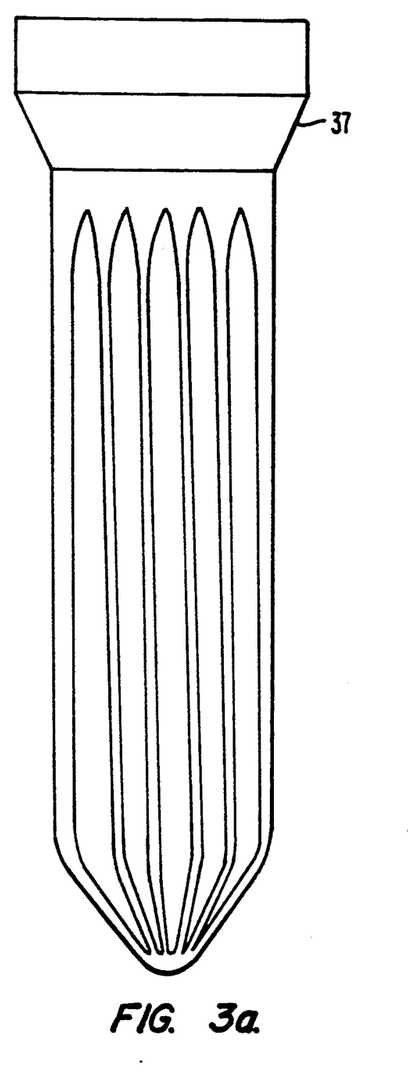
FIGS. 3a and 3b are side and cross-section views of a second example of a porous condom support member in accordance with the invention, mounted on an expanded base.
Figure 3B:
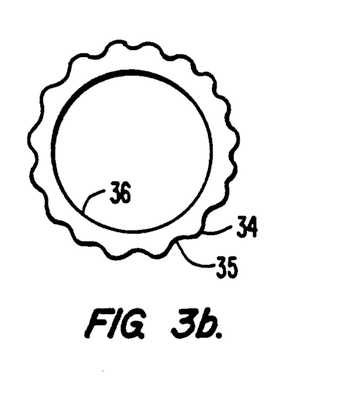
Figure 8:
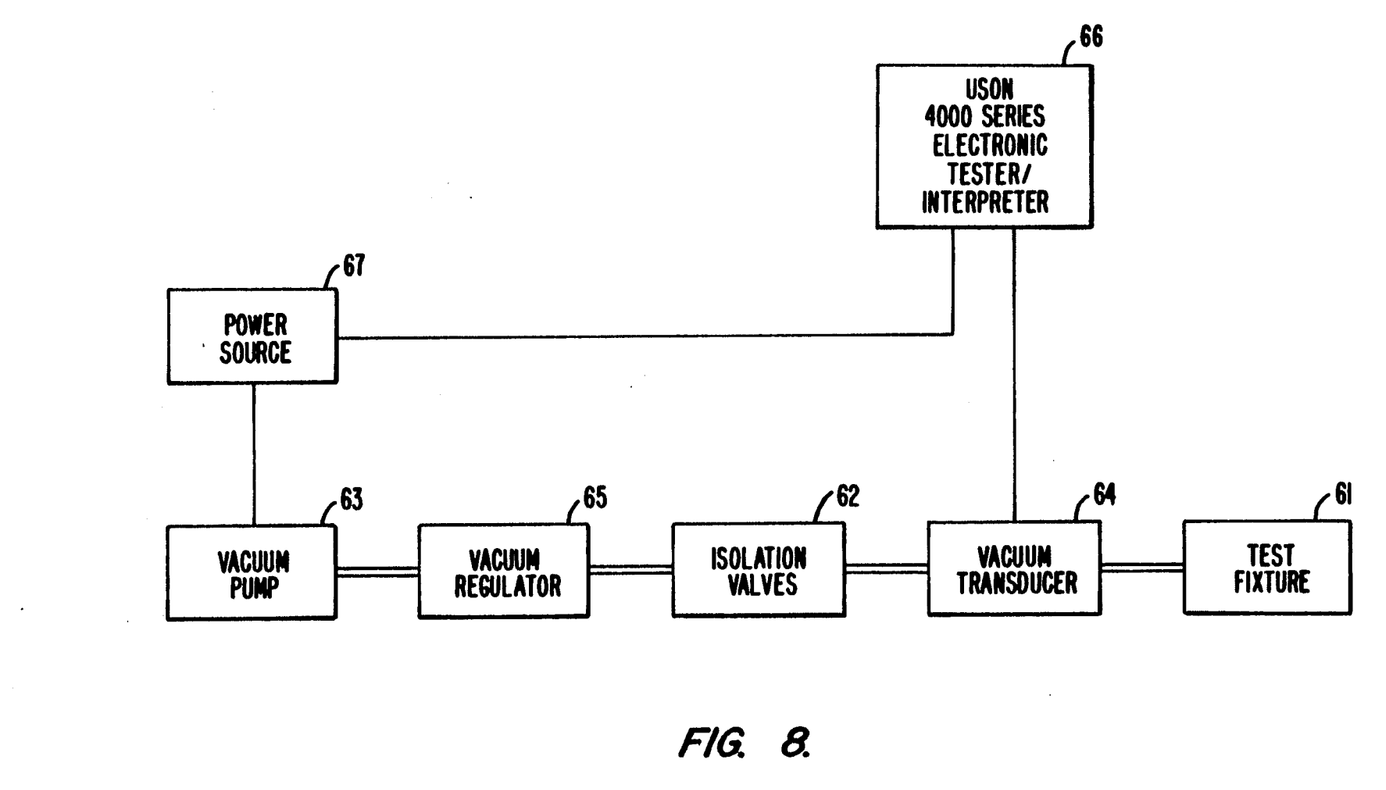
FIG. 8 is a block diagram of a leak testing system in accordance with the invention, including the test fixture and all other parts.

An illustration of a porous mandrel shell and insert appears in FIG. 1. The porous shell 11 is shown in cross section, and conforms generally in shape to the condom to be tested. The nonporous solid insert 12 fits inside the shell 11 in a loose but close fit. Both the shell and the insert are generally cylindrical in shape, being bodies of revolution around a central axis 13. An external longitudinal channel 14 runs along the outside of the insert on opposite sides (only one side being visible in the drawing). The external longitudinal channel 14 is joined to a central axial channel 15 through a radial channel 16. The central axial channel 15 leads through the base 17 on which the insert 12 and porous shell 11 are supported, to communicate with a vacuum pump and leak detection apparatus. The latter are illustrated in FIG. 8 and are discussed in detail below. The outer surface of the solid insert 12 contains a series of grooves or furrows 18 which open into the longitudinal channel 14. The grooves serve to minimize the gap between the insert and the shell while maximizing air flow inside the shell.

The insert in this embodiment is integral with the base 17 as a single piece, and the two form a shoulder 19 at the junction. The portion 20 of the insert immediately adjacent to the shoulder is not grooved but instead a smooth cylinder over which the open end of the shell 11 fits in a snug fit. The shoulder 19 is equal in width to the thickness of the shell so that the base 17 and shell 11 are flush at the juncture when joined. The base has an expanded portion 21 over which the condom stretches to form a tight seal.

While the porous mandrel is similar in shape to the condom to be tested, the mandrel will be specifically shaped, sized or both to cause the condom to stretch during the test. Thus, either the mandrel will have a simple cylindrical surface with a diameter exceeding that of the condom in its unstretched state such that the condom must be stretched to be placed over the mandrel, or the mandrel will have a surface contoured such that when the difference in pressure forces the condom against the surface, the condom will stretch to make full contact.

A contoured surface offers the advantage that the diameter, i.e., the longest cross-sectional measurement, of the mandrel can be equal to or less than the inner diameter of the condom in its unstretched state. Stretching of the condom over such a mandrel will only occur when the pressure differential is imposed. In the absence of the pressure differential, the condom can be drawn over the mandrel and removed from it with ease since the fit will be a loose one. A mandrel with a diameter slightly smaller than the inner diameter of the condom is preferred, since placement and removal of the condom will be easiest, with the least resistance, least need for mechanical intervention, and least risk of damage to the condom. A counter consideration is that the mandrel be large enough to avoid adding to the risk of wrinkling, folding or overlapping of the condom as it is placed over the mandrel.

With these considerations in mind, the relative diameters may vary. Best results will generally be obtained, however, in systems where the ratio of the outer mandrel diameter to the inner condom diameter is from about 0.90 to about 0.98. For condoms of approximately 1.6 inches (4.06 cm) inner diameter, a typical ratio may be about 0.95.

The degree of stretch of the condom under the pressure differential is equal to the ratio of the gross external surface area of the mandrel (as defined above) to the inner surface area of the condom. As those skilled in the art will understand, the surface areas being referred to here are those covering the portion of the condom to be tested (excluding regions adjacent to the open end where leakage is not considered to be a concern) and the portion of the mandrel which will be in surface contact with that portion of the condom. It is contemplated herein that mandrels contoured to induce a stretch in the condom will be so contoured that the entire surface portion of the condom which is being subjected to the test will when stretched come in contact with the porous mandrel surface, and that there will be no gaps between the condom and mandrel, other than over the pores themselves. In this way, no excess localized stress will occur at any point on the condom.

The degree of stretch will be sufficient to amplify the detection of any defects which exceed preselected limits which will generally be established by regulatory standards, but not so much as to cause certain irregularities or variations to be detected which are below such limits and otherwise undetectable, and not so much as to cause damage to the condom. With these considerations in mind, the degree of stretch which is acceptable in the practice of this invention may vary widely. In most cases, best results will be obtained with stretching of about 10% or greater, preferably with stretching of from about 20% to about 35%.

Figure 4:
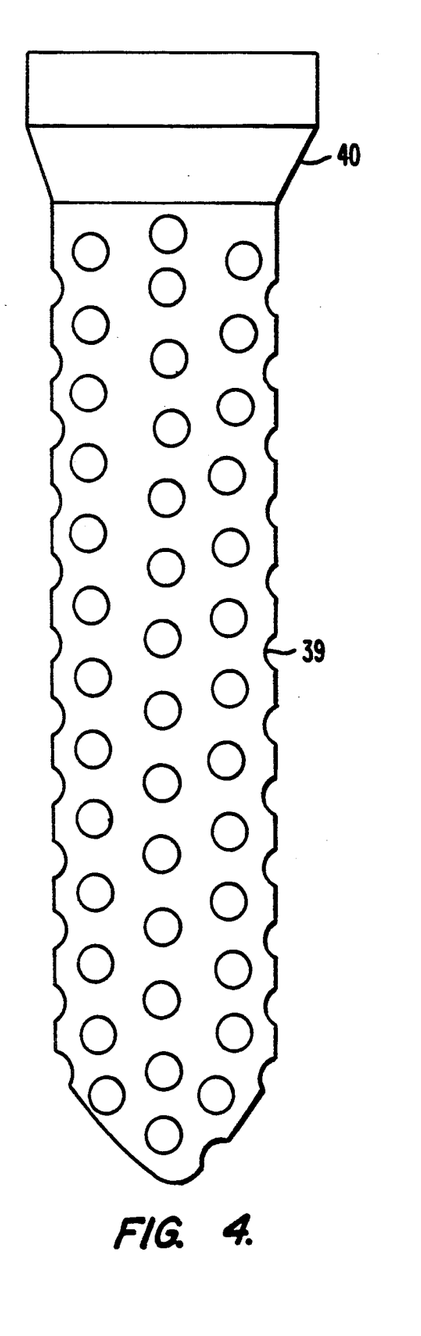
FIG. 4 is a side view of a third example of a porous condom support member in accordance with the invention, mounted on an expanded base.
Figure 5:
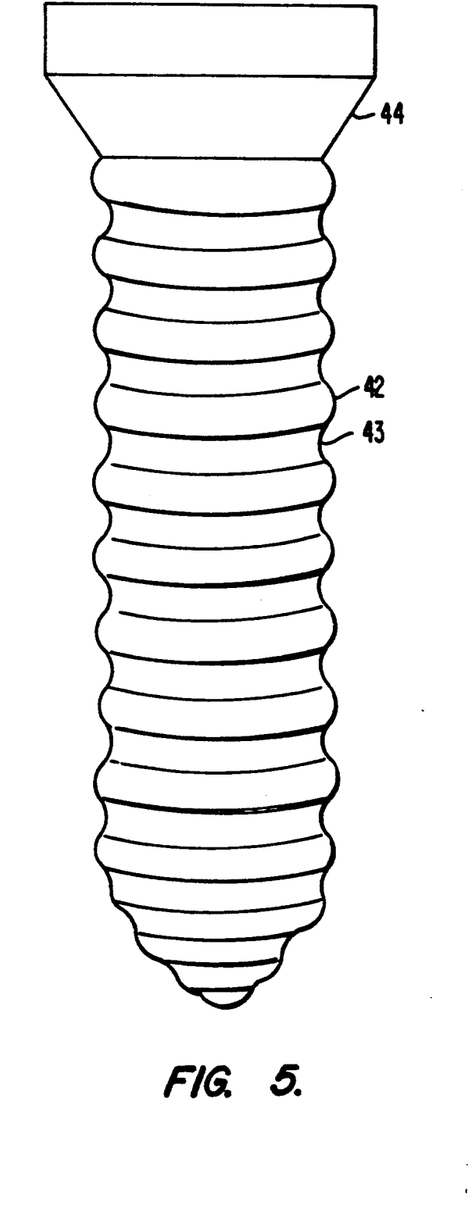
FIG. 5 is a side view of a fourth example of a porous condom support member in accordance with the invention, mounted on an expanded base.

FIGS. 2 through 5 illustrate various mandrel contours designed to cause stretching of the condom. The contour in FIGS. 2a and 2b is one of smoothly curved hills 31 and valleys 32, running longitudinally along the mandrel, i.e., parallel to its axis. The contour in FIGS. 3a and 3b forms similar hills 34 and valleys 35 (or grooves), the only difference being that the interior surface 36 of the mandrel is a smooth cylindrical contour. FIG. 4 illustrates a contour with circular indentations 39 rather than longitudinal hills and valleys. The indentations 39 are approximately hemispherical in shape and are arranged in staggered longitudinal rows. The contour in FIG. 5 is one of hills 42 and valleys 43, this time however running in the tangential direction to form rings around the mandrel.

Each of the mandrels in FIGS. 2a, 3a, 4 and 5 is shown joined to an expanded base, designated by the numerals 33, 37, 40 and 44, respectively, and corresponding to the expanded base 21 shown in FIG. 1. The expanded base is of nonporous material, highly polished, and of a diameter exceeding that of the condom. The condom will thus fit tightly over it in an essentially air-tight manner, such that essentially all passage of air into the mandrel will be attributable to leaks in the condom material itself. It is recognized that there will be a possibility of a slight amount of permeation or diffusion in the region of the base even if the condom contacts the base in a fully intact manner. The amount of diffusion will be greatest in systems with high pressure differentials across the condom membrane and with very thin membranes. Compensation for this incidental diffusion is readily made during the calibration of the system.

Figure 6:
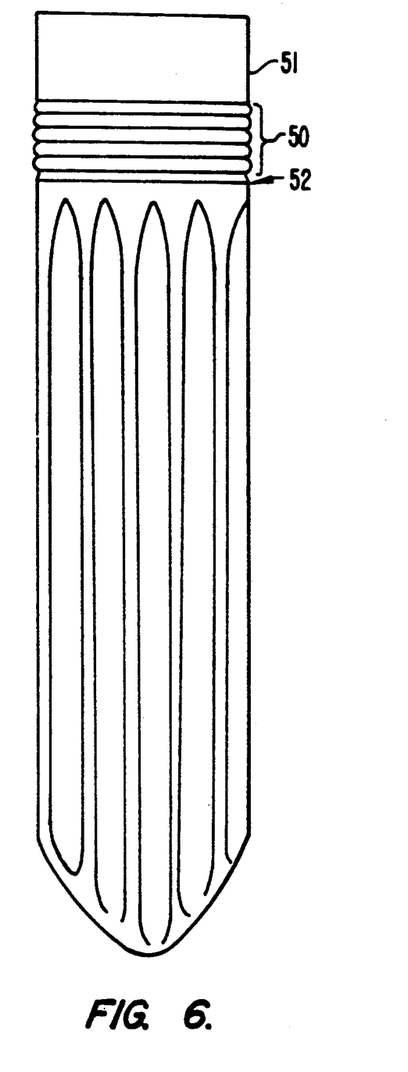
FIG. 6 is a side view of a fifth example of a porous condom support member, with an alternative structure at the base for sealing the open end of the condom.

This is but one example of forming an air-tight seal at the open end of the condom. Another example is the use of O-rings placed around the support fixture on which the mandrel is mounted. This is illustrated in FIG. 6, in which five O-rings 50 are shown on the support base 51 in a position adjacent to the open end 52 of the mandrel. The support base 51, like that shown in FIGS. 1 through 5, is of a nonporous material, but is not expanded. The O-rings however are sufficiently thick that when they are mounted to the support base 51 as shown, the diameter of each ring exceeds the inner diameter of the condom and thereby forms an air-tight seal. The outer surfaces of the O-rings are smooth to create an effective seal against the condom. The surfaces may be enhanced by encapsulation of the O-rings in smooth shells. For example, silicone rubber O-rings may be encapsulated in shells of hard plastic, such as tetrafluoroethylene or other fluorocarbon polymers. The support base 51 may be grooved to provide guides for placement of the O-rings and to stabilize them against shifting as the condom is being positioned for testing or withdrawn. As an alternative to the use of discrete O-rings, an O-ring-type profile can be machined into the surface of the base itself.

Figure 7A:
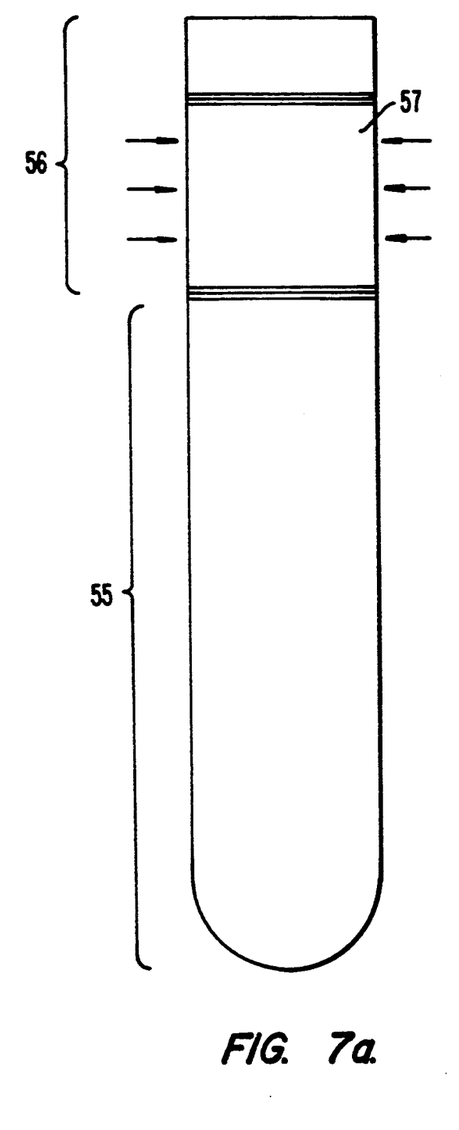
FIGS. 7a and 7b are side views of a sixth example of a porous condom support member in accordance with the invention, with a further alternative structure at the base for sealing the open end of the condom.
Figure 7B:
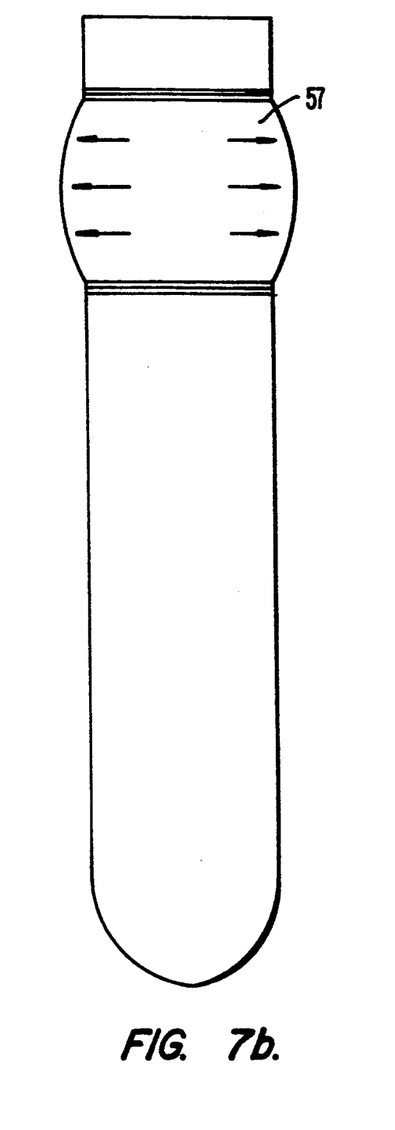

A further example of a structure for forming an air-tight seal is the use of an inflatable ring on the support base. FIGS. 7a and 7b are an illustration of this method. In this illustration, the porous mandrel 55 and support base 56 are of equal diameter. The inflatable ring 57 is of an elastomeric material with a smooth nonporous surface. The inflatable ring may itself be a hollow inflatable tube, secured to the support base, or a strip of elastomeric material secured along both longitudinal edges. In either case, means are provided (although not shown in the drawing) for supplying pressurized air or other suitable gas or liquid to the inside of the ring to inflate it and thereby expand its outer diameter as shown in FIG. 7b. As in the other examples, the expanded diameter exceeds the inner diameter of the condom in its relaxed state, causing the condom to cling tightly and form an air-tight seal. Mechanically expandable seals in place of, or in addition to, the inflatable seals can also be used. A variety of mechanically expandable seals are commercially available. Other methods and structures for forming a seal will readily occur to those skilled in the art.

In general, it is desirable to minimize the length of the portion of the condom where the seal is formed, since any defects on this portion of the condom will not be detected during the leak test. Current regulatory requirements in the United States do not require leak testing of the 1-inch (2.54-cm) length of the condom adjacent to the open end, and therefore mandrels and support bases which leak test the entire condom except for this 1-inch length will adequately serve the purpose. Preferred arrangements, however, will be those which limit the non-tested length even further.

The porous mandrel may be formed of any material which will provide a sufficiently rigid construction to avoid distortion or collapse during use, and yet allow sufficient porosity and permeability to permit the detection of leaks at any location on the condom except where the condom is sealed to the support base. Metallic and plastic materials are examples. A particularly useful plastic material for this purpose is polyethylene, although a wide range of other plastics will serve equally well.

A convenient method of forming the porous mandrel is one in which particles of the mandrel material are placed in a mold and sintered. Thus, for a plastic mandrel, the plastic in powder form is placed in a mold cavity around a core pin which provides the finished product with a hollow interior. The mold is then heated to fuse the particles together without causing them to melt and flow, thereby maximizing the final porosity. The mold is then cooled, and the resulting porous mandrel removed. An analogous process can be used to form a metal mandrel. In each case, the particle size, method of filling the mold, mold temperature, heating time, and all other factors, parameters and considerations encountered in forming the mandrel will be readily apparent to those skilled in the art.

An alternative method is one which uses a cylindrically shaped piece of porous material (which is commercially available), and involves machining it to the desired configuration. While the machining process may result in the closure of some of the pores, the closed pores can be reopened by electropolishing.

The degree of pressure differential used in the test is not critical and can vary widely. The pressure differential need be sufficient to cause a detectable flow through a leak, and preferred magnitudes of the differential will thus depend on the sensitivity of the detection system used as well as the requirements sought to be met. In most test systems in accordance with this invention, a pressure differential of at least about 0.30 atmosphere, preferably at least about 0.50 atmosphere, will provide the best results. A typical pressure differential which will produce satisfactory results with mandrels of the preferred characteristics described above is about 20 inches of mercury (0.67 atmosphere).

The differential is one in which the pressure outside the mandrel (and condom) exceeds the pressure inside. Thus, with the entire system initially at atmospheric pressure, the differential is created either by raising the external pressure or by lowering the internal pressure. The latter is preferred, and is readily achieved by conventional means such as, for example a conventional vacuum pump.

Once the pressure differential is applied, leak detection is performed by monitoring the system for gas flowing into the mandrel. This is done either directly (inside the mandrel itself) or indirectly (inside a conduit or vessel which is in flow communication with the mandrel interior). Indirect monitoring is preferred. This may be achieved in a variety of ways.

As one example, a vessel communicating with the mandrel interior may be isolated from the vacuum source once the vacuum has been applied, such that all flow into the vessel occurs only through the mandrel. The vessel may be the vacuum line itself. A pressure indicator communicating with the vessel interior then detects any decay in the vacuum, i.e., any rise in pressure, as an indication of the presence of a leak in the condom. Such an indicator may for example be a vacuum pressure transducer of the various types available commercially. A typical such instrument is a Uson Series 4000 pressure/vacuum decay tester, available from Uson Corporation, Houston, Tex.

A second example is the replacement of the atmospheric gas external to the mandrel and condom with a gas other than air which can be detected by analytical means such as mass spectrometry. An example of such a gas is helium. According to this example, the vacuum is continuously monitored by mass spectrometry for the presence of helium, indicating that gas has leaked through the condom.

A third example is the detection of air flow past a detection point in the vacuum line. This may be performed like the first example, by isolating the vacuum line once the vacuum has been applied, and monitoring for air flow only after this isolation has occurred. Alternatively, monitoring may be performed without isolation of the line, while the line is still connected to the vacuum source. Conventional instruments such as a mass-flow transducer may be used to perform the detection. Other examples will readily occur to those skilled in the art.

In all of these examples, only those signals exceeding a predetermined base signal level are taken as an indication of a leak. The base signal level may be one which is attributable to system noise or to a degree of air permeability which is considered acceptable by the standards under which the test is conducted.

Although air has been cited herein as the atmospheric gas used in the testing procedure, any gas may be used. The choice of gas is not critical, except for embodiments such as the second example cited above for leak detection. Air will suffice, however, and is generally preferred for purposes of convenience.

A typical vacuum test circuit for use in accordance with this invention is represented by the block diagram in FIG. 8. This circuit uses the vacuum decay method of leak detection. The test fixture 61 consists of the porous mandrel mounted over the base and insert. Once the condom is in position over the mandrel, an isolation valve 62 is opened and a vacuum pump 63 is energized, drawing a vacuum through a vacuum transducer 64, the open isolation valve 62 and a vacuum regulator 65. Once the vacuum has stabilized, the isolation valve 62 is closed, and the vacuum transducer 64 is monitored by the electronic vacuum decay tester 66. Power to both the decay tester 66 and the vacuum pump 63 is supplied by a power source 67.

Although this specification is addressed specifically to condoms, the leak testing apparatus and method disclosed herein are applicable to sheaths in general, particularly prophylactic sheaths. These include finger cots, surgical gloves, and the like. Condoms are of particular interest in view of their role in preventing the spread of sexually transmitted diseases.

The invention is also applicable to condoms or sheaths made of a wide variety of materials. Prime examples of these materials are latex rubbers and polyurethanes, although other materials are relevant as well. Examples are silicone elastomers, ethylene-propylene thermoplastic elastomers, styrene block copolymer thermoplastic elastomers such as styrene-butadiene-styrene block copolymers and styrene-isoprene multiarm (branched) copolymers, olefinic thermoplastic elastomers, polyether-block-amide thermoplastic elastomers, polyvinylchlorides, and acrylic-based thermoplastic elastomers. Of the polyurethanes, both polyether-based and polyester-based polyurethanes are included, as well as block copolymer polyurethanes and those containing chain extenders and modifiers. Other examples will be apparent to those skilled in the art.

The foregoing is offered primarily for purposes of illustration. It will be readily apparent to those skilled in the art that numerous modification and variations in terms of the materials, components, dimensions, and operating procedures beyond those referred to above may be made without departing from the spirit and scope of the invention.

We claim:

1. A method for leak testing a prophylactic sheath, said method comprising:
   (a) placing said sheath over a support member in a gaseous atmosphere, said support member having an external surface conforming at least approximately in shape to said sheath, said support member being formed of a porous material with pore openings distributed substantially uniformly over said external surface, the pores of said porous material communicating said external surface of said support member with the interior of said support member, and said sheath covering all pore openings on said external surface;
   (b) creating a pressure differential across said sheath while thus placed over said support member, such that the pressure external to said sheath is higher than the pressure in the interior of said support member; and
   (c) monitoring the interior of said support member for gas flow entering through the wall of said sheath in the presence of said pressure differential, as an indication of the existence of a leak in said sheath.

2. A method in accordance with claim 1 in which said sheath is of an elastic material and the surface area of the external surface of said support member exceeds the surface area of said sheath, thereby causing said sheath to stretch during steps (b) and (c).

3. A method in accordance with claim 2 in which said sheath and said support member are of generally circular cross section, and the circumference of said support member exceeds that of said sheath.

4. A method in accordance with claim 2 in which said sheath and said support member are generally cylindrical in shape, and the diameter of said support member is less than the diameter of said sheath, and said support member is contoured to form indentations in the external surface thereof sufficient to provide said support member with an external surface area exceeding the surface area of said sheath.

5. A method in accordance with claim 4 in which said indentations are furrows oriented axially along the length of said support member.

6. A method in accordance with claim 4 in which said indentations are furrows oriented tangentially around said support member.

7. A method in accordance with claim 4 in which said indentations are circular depressions distributed substantially uniformly over the external surface of said support member.

8. A method in accordance with claim 2 in which the difference between said surface areas is such that said sheath is caused to stretch by at least about 10% when in full contact with said external surface of said support member.

9. A method in accordance with claim 2 in which the difference between said surface areas is such that said sheath is caused to stretch by from about 20% to about 35% when in full contact with said external surface of said support member.

10. A method in accordance with claim 2 in which said sheath and said support member are generally cylindrical in shape, the difference between said surface areas is such that said sheath is caused to stretch by from about 20% to about 35% when in full contact with said external surface of said support member, and the diameter of said support member is less than the diameter of said sheath, and said support member is contoured to form indentations in the external surface thereof sufficient to provide said support member with an external surface area exceeding the surface area of said sheath.

11. A method in accordance with claim 1 in which said pore openings range from about 0.2 micron to about 100 microns in diameter.

12. A method in accordance with claim 1 in which said pore openings range from about 10 microns to about 50 microns in diameter.

13. A method in accordance with claim 1 in which said pressure differential of step (b) is at least about 0.30 atmosphere.

14. A method in accordance with claim 1 in which said pressure differential of step (b) is at least about 0.50 atmosphere.

15. A method in accordance with claim 1 in which said support member is a shell having a wall thickness of from about 0.04 inch to about 0.5 inch.

16. A method in accordance with claim 1 in which step (c) comprises monitoring the rate of gas flow into the interior of said support member and detecting the amount by which said rate exceeds a predetermined base rate as an indication of the existence of a leak in said sheath.

17. A method in accordance with claim 1 in which step (c) comprises displacing at least a portion of the atmosphere external to said sheath with a detectable gas and monitoring the presence of said detectable gas in the interior of said support member above a predetermined base level as an indication of the existence of a leak in said sheath.

18. Apparatus for leak testing a prophylactic sheath, said device comprising:
   a sheath support member formed of a porous material with pore openings distributed substantially uniformly over the external surface thereof, the pores of said porous material communicating said external surface with the interior of said sheath support member;
   means for creating a pressure differential across said sheath support member, such that the pressure external thereto is higher than the pressure in said interior; and
   means for monitoring said interior for gas flow entering through said porous material.

19. Apparatus in accordance with claim 18 said sheath support member is generally cylindrical in shape, and is contoured to form indentations in said external surface.

20. Apparatus in accordance with claim 19 in which said indentations are furrows oriented axially along the length of said sheath support member.

21. Apparatus in accordance with claim 19 in which said indentations are furrows oriented tangentially along the length of said sheath support member.

22. Apparatus in accordance with claim 19 in which said indentations are circular depressions distributed substantially uniformly over said external surface.

23. Apparatus in accordance with claim 18 in which said pore openings range from about 0.2 microns to about 100 microns in diameter.

24. Apparatus in accordance with claim 18 in which said pore openings range from about 10 microns to about 50 microns in diameter.

25. Apparatus in accordance with claim 18 in which said sheath support member is a shell surrounding a hollow core.

26. Apparatus in accordance with claim 25 in which said shell has a wall thickness ranging from about 0.040 inch to about 0.500 inch.

27. Apparatus in accordance with claim 18 in which said sheath support member is a shell surrounding a core containing a nonporous body.

28. Apparatus in accordance with claim 27 in which said shell has a wall thickness ranging from about 0.04 inch to about 0.5 inch.

29. Apparatus in accordance with claim 18 further comprising a base securable or secured to said sheath support member, said base containing a section which is either expandable or expanded to a diameter exceeding that of said sheath support member to secure the open end of a prophylactic sheath thereto in airtight manner.

* * * * *